United States Patent [19]

Morlotti et al.

[11] Patent Number: 4,792,691
[45] Date of Patent: Dec. 20, 1988

[54] METHOD FOR RECORDING AND REPRODUCING A RADIATION IMAGE, RADIATION IMAGE STORAGE PANEL, PHOTOSTIMULABLE PHOSPHORS AND METHOD FOR OBTAINING SAID STIMULABLE PHOSPHORS

[75] Inventors: Romano Morlotti, Ferrania/Savona; Florian Krawietz, Albisola Mare/Savona, both of Italy

[73] Assignee: Minnesota Mining and Manufacturing Company, St. Paul, Minn.

[21] Appl. No.: 68,642

[22] Filed: Jun. 30, 1987

[30] Foreign Application Priority Data

Jul. 9, 1986 [IT] Italy ............... 21069 A/86

[51] Int. Cl.$^4$ ............... G01T 1/10; C09K 1/22
[52] U.S. Cl. ............... 250/484.1; 250/327.2; 252/301.45
[58] Field of Search ............... 250/484.1 B, 327.2 A; 252/301.45, 301.45

[56] References Cited

U.S. PATENT DOCUMENTS 3,669,897  6/1972  Wachtel ............... 252/301.45
4,427,570  1/1984  Yok et al. ............... 252/301.4 R
4,698,508 10/1987  Nakamura et al. ............... 250/484.1 B

FOREIGN PATENT DOCUMENTS 6917280  5/1971  Netherlands ............... 252/301.45
0286100 11/1970  U.S.S.R. ............... 250/484.1 B
1161871  5/1965  United Kingdom .

OTHER PUBLICATIONS

Tsuda et al "Fe-Activated FR Emit. Phosph.", Chem. Abstracts vol. 86, (1977) 86:64481r.
R. L. Calvert and R. J. Danby, Thermoluminescence and Radiophotoluminescence From Eu- and Sm--Doped CASO4, 1/3/84, 8 pages, Subject Classification 11 and 20.3; 13.4; 22.8.1, Phys. Status Solidi A 83, (1984) p. 597.
K. Takahaski et al, Journal of Luminescence, 31 and 32, 1984–Mechanism of Photostimulated Luminescence in Europium Doped Barium Fluorohalides.

*Primary Examiner*—Carolyn E. Fields
*Assistant Examiner*—Richard Hanig
*Attorney, Agent, or Firm*—Donald M. Sell; Mark A. Litman

[57] ABSTRACT

A method for recording and reproducing a radiation image comprising the steps of (i) causing a phosphor, which can be stimulated by light radiation, to absorb a radiation passing through an object, (ii) stimulating said phosphor with light radiation to release the stored energy as fluorescent light, and (iii) detecting said fluorescent light with light detecting means, is characterized by the fact that said stimulating radiation is in the range of the visible light and the detected fluorescent light is in the range of the infrared radiation. Infrared emitting photostimulable phosphors include barium or strontium sulfates or solid solutions thereof doped with alkali metal ions. A method for obtaining said phosphors comprises heating at a temperature of at least 600° C. A radiation image storage panel includes phosphors which, upon stimulation with visible light, emit radiation in the range of infrared region.

17 Claims, 1 Drawing Sheet

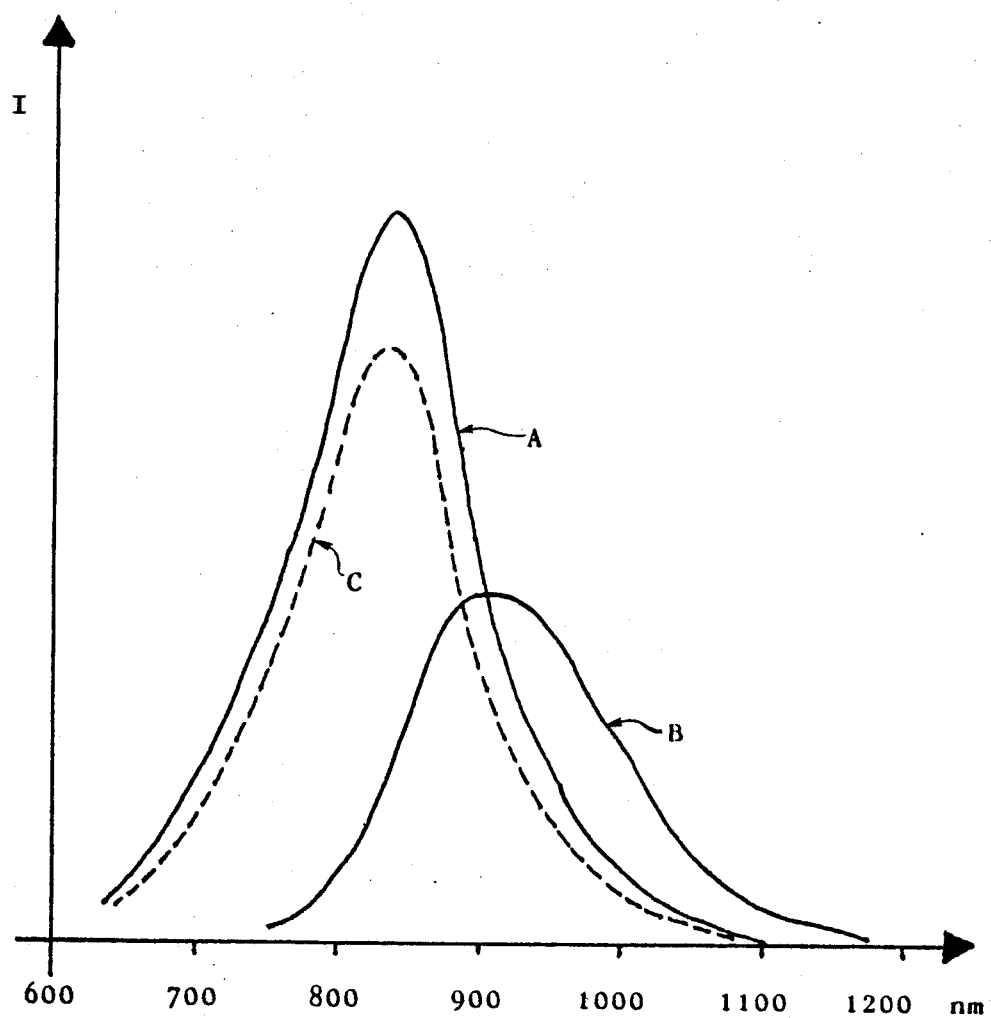

10
METHOD FOR RECORDING AND REPRODUCING A RADIATION IMAGE, RADIATION IMAGE STORAGE PANEL, PHOTOSTIMULABLE PHOSPHORS AND METHOD FOR OBTAINING SAID STIMULABLE PHOSPHORS

FIELD OF THE INVENTION

In one aspect the present invention relates to a method for recording and reproducing an ionizing radiation image by using photostimulable phosphors.

In another aspect the present invention refers to photostimulable phosphors, in particular to phosphors which, upon stimulation thereof with visible radiation after exposure to ionizing radiation, emit radiation in the infrared region.

In a still another aspect the present invention relates to a radiation image storage panel which includes photostimulable phosphors.

In a further aspect the present invention refers to a method for preparing said phosphors.

BACKGROUND OF THE ART

Certain luminescent substances (phosphors), comprising an inorganic compound (matrix) doped with ions of elements (activators), show a direct light emission upon exposure to ionizing radiation, in particular to X-rays or cathodic rays. These luminescent substances are commonly called direct emission phosphors. Examples of such phosphors are $BaSO_4:Pb$, $Ba_{1-x}Sr_xSO_4:Eu$, $Gd_2O_2S:Tb$ and the like. The direct emission process of such phosphors can be explained by the fact that, after absorption of the radiation, an electron of the matrix crystal lattice is elevated to the conduction band from the valence stable band and thereafter falls down into the valence stable band; the recombination energy is then transferred to the nearest activator ion which is thus brought to an excited level; by the ion's return to the stable state, the excited ion produces a light emission characteristic of that element.

It is also known that some other matrices doped by ions of some elements show a light emission if photostimulated after exposure thereof to X-rays or Cathodic rays. These photoluminescent substances are commonly called photostimulable or storage phosphors. Examples of such stimulable phosphors are LaOBr:Ce,Tb and BaFCl:Eu. The photostimulated emission process is in this case explained by the presence of traps in the crystal lattice, in general F+ centers, i.e. vacancies of oxygen and/or bromine and fluorine and/or chlorine lacking in an electron; these centers trap the electrons produced upon exposure to the ionizing radiation and release them upon subsequent photostimulation; the released electrons are transferred to the activator element which generates its own characteristic light emission by the same mechanism as direct emission phosphors. A photostimulated luminescent mechanism of this type is for instance reported for BaFX:Eu in Journal of Luminescence 31 and 32 (1984), 266–268.

Among the photostimulable phosphors, in Phys. Status Solidi A 83, (1984), 597–604 there are described Eu and Sm doped calcium sulfates which, after exposure to X-rays or UV-rays, have a photostimulated luminescence characteristic of the activator element.

Generally, the photostimulable phosphors exposed to ionizing radiation show a direct luminescence also due to the activator elements. In these phosphors, therefore, both mechanisms are in reciprocal competition: the direct luminescence due to the excited activator elements and the photostimulated luminescence due to the storage of the exciting energy in suitable centers (traps) which upon subsequent photostimulation are capable of supplying electrons to excite such activators.

The photostimulated luminescence phosphors find a particular application in the methods for recording and reproducing an ionizing radiation image (e.g. digital radiography), where the phosphor which has absorbed the ionizing radiation is stimulated with light radiation to release the stored radiation energy in the form of fluorescent light.

In practice, such phosphors have some disadvantages, such as for instance a sensitivity quite insufficient for an industrial method, a persistence of the stored information which tends to decrease over time and, above all, the wavelengths of the fluorescent photostimulated light partially overlapping the stimulating radiation, thus making the use of optical filters necessary to separate such light from such radiation.

Therefore, from the point of view of the practical use of such methods, there is a need to have photostimulated luminescence phosphors with improved characteristics with respect to those phosphors known in the art, and most importantly photostimulated luminescence phosphors emitting fluorescent light in a region of the electromagnetic spectrum which is separated from the stimulating radiation region of the electromagnetic spectrum.

U.S. Pat. No. 3,859,527 describes a method for producing an image corresponding to a releasably stored image of pattern of high energy radiation comprising releasing the stored image as modulated light, converting the modulated light into corresponding electrical signal, producing intensity modulated light from the electrical signal and possibly recording the produced modulated light.

U.S. Pat. No. 4,236,078 describes a method for recording and reproducing a radiation image comprising exposing a stimulable phosphor with radiation passing through an object, stimulating said phosphor with stimulating visible or infrared rays and detecting the released fluorescent light, the stimulating rays having a wavelength of no less than 500 nm and the phosphor being chosen within the group including Eu and Pb activated zinc sulfide; Eu activated barium aluminate; Ce, Tb, Eu, Tm, Pb, Ti, Bi and Mn activated silicate of Mg, Ca, Sr, Zn and Ba; and Ce, Tb activated oxyhalides of La, Y, Gd and Lu.

U.S. Pat. No. 4,258,264 describes a method of reading out a radiation image stored in a stimulable phosphor comprising stimulating the phosphor with rays having a wavelength within a range of 600 to 700 nm and detecting the emitted light whose wavelength is within the range of 300 to 500 nm.

SUMMARY OF THE INVENTION

A method is provided for recording and reproducing a radiation image based on photostimulable phosphors wherein the stimulating radiation is in the range of visible light and the release fluorescent light is in the range of the infrared region. Photostimulable phosphors according to the present invention include barium and strontium sulfates and the solid solutions of barium and strontium sulfates doped with alkali metal ions. When said phosphors are stimulated with visible light after exposure to ionizing radiation (such as X-rays, gamma-rays, alpha-rays or far UV-rays, i.e. UV-rays having a wavelength lower than 300 nm), they emit radiation in the infrared region. The photostimulated emission intensity is increased by introducing metallic elements, in particular tin, iron and nickel, in addition to the alkali metals.

Said phosphors may be prepared by means of high temperature thermal processing either of barium or strontium sulfates or of the solid solutions of barium and strontium sulfates in the presence of alkali metal salts, preferably in the presence also of tin and/or iron and/or nickel salts.

A radiation image storage panel including a phosphor of the present invention emits radiation in the infrared region of the electromagnetic spectrum upon stimulation with visible radiation.

DETAILED DESCRIPTION OF THE INVENTION

In one aspect the present invention refers to a method for recording and reproducing a radiation image comprising the steps of (i) causing the visible radiation stimulable phosphor to absorb radiation passing through an object, (ii) stimulating said phosphor with visible radiation to release the stored energy as fluorescent light and (iii) detecting said fluorescent light with a photodetector, said method being characterized by the fact that said stimulating radiation is in the range of visible (blue, green or red) light and the detected fluorescent light is in the range of infrared radiation.

To the purposes of the present invention it will be useful to make clear the language which is used herein to describe wavelength regions. The term "infrared radiation" includes wavelengths longer than 700 (see for example The Focal Dictionary of Photographic Technologies, D.A. Spencer, Focal Press Ltd. (1973), page 305) and the "visible radiation" including wavelengths of 400 to 700 nm.

The present invention further relates to a method as described above wherein the wavelength of the stimulating radiation is in the range of 500 to 700 nm, more preferably of 550 to 650 nm, and the wavelength of the detected light is higher than 700 nm, preferably is in the range of more than 700 to 2000 nm, more preferably is in the range of 750 to 1200 nm.

It has been generally accepted that a minimum difference (e.g. 50 nm) between stimulating and emitted radiation is required. In the practice of the present invention it is convenient to respect such teaching of the art.

In another aspect, the present invention refers to photostimulable phosphors selected from the group consisting of barium sulfates, strontium sulfates and solid solutions of barium and strontium sulfates doped with alkali metal ions (such as Na, K, Rb and Li).

Particularly, the present invention refers to the above mentioned photostimulable phosphors comprising sodium and potassium ions.

More particularly, the present invention refers to the above mentioned phosphors further comprising metal ions, preferably tin, iron and/or nickel ions.

Most particularly, the present invention refers to the above mentioned phosphors corresponding to the general formula:

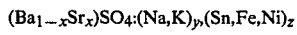

$(Ba_{1-x}Sr_x)SO_4:(Na,K)_p,(Sn,Fe,Ni)_z$ wherein x is a number satisfying the condition $0 \leq x \leq 1$, y is a number satisfying the condition $10^{-4} \leq y \leq 10^{-1}$ and z is a number satisfying the condition $0 \leq z \leq 10^{-2}$.

Still in a further aspect, the present invention relates to a radiation image storage panel comprising a fluorescent layer including a binder and a photostimulable phosphor dispersed in said binder, wherein said phosphor upon stimulation with visible light emits light in the infrared region.

DETAILED DESCRIPTION OF THE DRAWINGS

FIG. 1 shows the emission spectral distribution curves of phosphors of the present invention obtained with the method hereinafter described. The curves plot the emission intensity (I) against the detected wavelength emitted upon stimulation (at 633 nm) with a He-Ne laser. Particularly, curves A, B and C respectively refer to phosphors having the following compositions: A equal to $SrSO_4:1.3\times10^{-4}Na, 2.4\times10^{-4}Sn$; B equal to $BaSO_4:3.3\times10^{-5}Na, 2.4\times10^{-4}Sn$; and C equal to $SrSO_4:1.3\times10^{-4}Na$. Curves A and B show the different detected emission distribution of the phosphors of the present invention depending upon the presence of barium or strontium. Curves A compared with Curve C shows the effect of Na-Sn combination with respect to Na alone as dopant.

Once the photostimulable emitting centers are formed in the phosphor upon exposure to X-Rays or other ionizing radiation, these centers can be stimulated a number of times (such as 10 to 100) with the same or different wavelength to obtain the same detectable photostimulated emission. The stored energy has been found to be cancelled, thus taking the phosphor back to the initial or clean condition prior to the imagewise exposure thereof to ionizing or penetrating radiation, by exposing the phosphor to UV-rays having a wavelength higher than 300 nm (e.g., greater than 300 to less than 400 nm).

The photostimulable luminescence of the phosphors of the present invention is believed to be due to the fact that the alkali metal ions replace the strontium or barium ions thus causing anionic vacancies due to the need of electroneutrality. In fact, $F^+$-type centers (which are anionic vacancies with a trapped electron) have been put in the crystal lattice as evidenced with ESR (Electron Spin Resonance) measurements. This has been particularly done for the barium sulfates of the present invention and these $F^+$-type centers are reasonably thought to be anionic vacancies (vacancies of oxygen, sulfur or more probably of sulfate groups) each with an electron. Other anionic vacancies, lacking in two electrons or neutral, may be thought to be present in the phosphors of the present invention. Said anionic vacancies work as traps for the electrons produced by the exposure of the phosphors to the penetrating radiation, thus forming emission centers. The photostimulated luminescence mechanism in the phosphors of the present invention, according to the experimental data, is deemed to be explainable by the relaxation of said emission centers excited by the stimulating radiation.

According to the present invention, barium or strontium sulfate compounds or solid solutions are thermally processed in the presence of alkali metal salts, preferably alkali metal sulfates, more preferably sodium or potassium sulfate, to induce the presence of $F^+$ centers which are believed to cause the particular characteristics of the phosphors of the present invention. Such thermal processing includes heating (which can be performed in the presence of a salt acting as a flux, such as ammonium sulfate) at temperatures in the range of 600° to 1400° C., preferably 800° to 1100° C., and cooling at room temperature before the obtained phosphors are repeatedly washed with water to purify. Lower cooling times have been associated with higher photostimulated efficiencies. It is preferred for instance to cool the phosphors in the air, by taking it out of the stove, after extinguishing the stove, instead of leaving the phosphor to cool inside the stove. It is more preferred to cool the phosphor in liquid nitrogen and then allow it to warm to room temperature.

Heating can be performed with a mechanical mixture of the sulfates in a crucible in air or inert gas atmosphere, e.g. argon, for a time ranging from 2 to 48 hours, preferably from 4 to 8 hours.

Heating can also be performed with the composition obtained by dissolving the sulfates or other salts, such as e.g. carbonates, hydroxides, chlorides of barium or strontium or of barium and strontium chlorides and of the alkali metals, in concentrated sulfuric acid and evaporating the solution at a temperature ranging from 100° to 200° C.

The photostimulated luminescence of the above described phosphors is increased by heating the above phosphors compounds in the presence of additional compounds, such as salts (including complex salts), oxides (including hydroxides), preferably salts, of metals such as tin, iron, nickel, preferably added to the sulfuric acid solution of strontium or barium or strontium and barium and alkali metal salts. Examples of such salts are sulfates, carbonates, chlorides, nitrates and acetate complex salts. Such additional compounds normally have molecular weights below 500.

The phosphors can also be reduced to the desired dimensions, according to techniques known in the art, to better fit application needs.

The stimulable phosphors of the present invention are useful in all optoelectronic applications, which make use of ionizing radiation induced storage phosphors. In particular, the phosphors of the present invention are useful in digital radiography for recording and reproducing an ionizing radiation image.

The panels of the present invention normally comprise a fluorescent layer including a binder and, dispersed therein, at least one phosphor selected from the group of the above mentioned barium sulfates, strontium sulfates and solid solutions of barium and strontium sulfates doped with alkali metal ions. The fluorescent layer is formed by dispersing the phosphor in the binder to prepare a coating dispersion, and then applying the coating dispersion by a conventional coating method to form a uniform layer. Although the fluorescent layer itself can be a radiation image storage panel when the fluorescent layer is self-supporting, the fluorescent layer is generally provided on a substrate to form a radiation image storage panel. Further, a protective layer for physically and chemically protecting the fluorescent layer is usually provided on the surface of the fluorescent layer. Furthermore, a primer layer is sometimes provided between the fluorescent layer and the substrate to closely bond the fluorescent layer to the substrate.

As the binder employed in the fluorescent layer of the radiation image storage panel of the present invention, there can, for example, be used such binders commonly used in forming layers such as gum arabic, protein such as gelatin, polysaccharides such as dextrane, organic polymer binders such as polyvinylbutyral, polyvinylacetate, nitrocellulose, ethylcellulose, vinylidenechloride-vinylchloride copolymer, polymethylmethacrylate, polybutylmethacrylate, vinylchloride-vinylacetate copolymer, polyurethane, cellulose acetate butyrate, polyvinyl alcohol, and the like.

Generally, the binder is used in an amount of 0.01 to 1 part for each part by weight of the luminescent phosphor. However, from the viewpoint of sensitivity and sharpness of the obtained panel, the amount of binder should preferably be small. Accordingly, in consideration of both sensitivity and sharpness of the panel and the easiness of application of the coating dispersion, the binder is preferably used in an amount of 0.03 to 0.2 parts by weight for each part by weight of the stimulable phosphor. The thickness of the fluorescent layer is generally within the range of $10\mu$ to 1 mm.

In the radiation image storage panel of the present invention, the fluorescent layer is generally coated on a support. As a support, various materials such as polymer material, glass, wool, cotton, paper, metal, or the like can be used. From the viewpoint of using the panel as an information recording medium, the support should preferably be processed into a sheet, film, or a roll having flexibility. In this connection, the support should preferably be an organic polymeric film such as a cellulose acetate film, a polyester film, a polyethyleneterephthalate film, a polyamide film, a triacetate film, a polycarbonate film, or the like, or ordinary paper or processed paper such as photographic paper, baryta paper, resin-coated paper, paper containing or coated with a pigment such as titanium dioxide, or the like. The support may be provided with a primer layer on one surface thereof (the surface on which the fluorescent layer is coated) for the purpose of holding the fluorescent layer tightly. An ordinary adhesive can be used as the material of the primer layer. In providing a fluorescent layer on the support or on the primer layer, a coating dispersion comprising the luminescent phosphor dispersed in a binder may be directly applied to the support or to the primer layer to form a fluorescent layer. Alternatively, a fluorescent layer formed beforehand may be bonded to the support or to the primer layer. Where the support used is permeable to the stimulating radiation of the phosphor, the radiation image storage panel can be exposed to the stimulating radiation from the support side.

Further, in the radiation image storage panel of the present invention, a protective layer for physically and chemically protecting the fluorescent layer is generally provided on the surface of the fluorescent layer intended for exposure (on the side opposite to the support). When, as mentioned above, the fluorescent layer is self-supporting, the protective layer may be provided on both surfaces of the fluorescent layer. The protective layer may be provided on the fluorescent layer by directly applying thereto a coating dispersion to form the protective layer thereon, or may be provided thereon or by bonding thereto the protective layer formed beforehand. The material of the protective layer may be a conventional material for protective layer such as nitrocellulose, ethylcellulose, cellulose acetate, polyester, polyethyleneterephthalate, and the like.

The radiation image storage panel of the present invention may be colored with a dye. Further, the fluorescent layer on the radiation image storage panel of the present invention may contain a white powder dispersed therein. By using a dye or a white powder, a radiation image storage panel which provides an image of high sharpness can be obtained.

The apparatus to realize the method for recording and reproducing a radiation image according to the present invention schematically comprises a radiation source, an object, a radiation image storing panel comprising coated on a support a fluorescent layer which comprises a binder and a photostimulable phosphor, a light source emitting radiation which stimulates the phosphor layer of the panel to release the radiation energy stored therein as fluorescent light (comprising for instance a quartz iodine lamp, a grating monochromator, a shutter and a focusing lens), a focusing lens to collect the photostimulated and stimulating light respectively emitted and reflected by the panel, a filter to absorb the radiation emitted by the light source and reflected by the panel (in the case of the present invention visible radiation) and send only the fluorescent light emitted by the panel (in the case of the present invention infrared radiation). In the present method, a photosensor is used for detecting the light emitted by the panel. The electrical signals are amplified and recorded or revealed by a reproducing device.

The target object is positioned between the radiation source (such as an x-ray tube) and the radiation image storing panel. When the object is exposed to x-rays, the radiation passes through the object and the intensity of the radiation passed through it presents the transmission factor of that object. Therefore, the radiation striking the panel gives an image which represents the transmission pattern of the object. The radiation is absorbed by the phosphor layer of the panel and electrons or holes are generated in the phosphor layer according to the quantity of absorbed radiation. The electrons or holes are captured by the storing centers of the phosphors of the present invention, thus forming the photostimulable emission centers. The stored radiation image in the panel is rendered detectable by stimulating the panel with a stimulating radiation emitted by the visible light source. For instance, the stimulating radiation can be produced by a Philips quartz iodine 12 V-100 W lamp and by a Higer-Watts grating monochromator to select any wavelengths in the visible light, or more preferably by a laser beam emitting light of a single wavelength, such as an Argon ion laser beam (488 nm and 514.5 nm) or more preferably a He-Ne laser ray (633 nm). The phosphor layer of the panel is scanned with the stimulating radiation emitted by the light source and focused on a small spot (e.g. a 30 $\mu m^2$ to 0.7 $mm^2$ surface spot), for which reason the luminescent centers emit light corresponding to the stored radiation image.

The luminance of the light emitted by the panel is proportional to the number of electrons or holes stored in the fluorescent layer of the panel, i.e. to the quantity of radiation absorbed by the layer itself. A lens is used to collect the light photostimulated and reflected by the panel. The undesired stimulating light is filtered with an interference filter, the transmission peak of which is set to the wavelength of the signal emitted by the sample (e.g. a Schott BG1 or BG3 filter). The infrared fluorescent light is detected and transformed into an electrical signal by the photosensor, e.g. a Thorn-Emi 9658 type photomultiplier, then amplified by a picoameter, e.g. a Kithley 417 high sensitivity picoameter. The obtained electrical signal is transformed into an image signal corresponding to the radiation image by a reproduction device, such as a Gould 2200 graphic recorder or a storage oscilloscope. Preferably, the above reported method for recording and reproducing a radiation image, which makes use of a panel with the phosphors of the present invention, comprises the steps of exposing the panel to light having a wavelength in the range of ultraviolet light prior to exposing the panel to the radiation to be recorded and reproduced. In fact, in the above reported method utilizing the photostimulable phosphors, the image may be degraded by a ground noise and the resolving power decreased, when the panel is used repeatedly or is stored for many hours after having been used. This occurs because the panel is often struck by radiation different from those used for recording the radiation image before exposing the panel to such radiation and the stored energy of such different radiation upon stimulation emits light together with the energy of the radiation to be recorded. This different radiation can be for instance radiation emitted by radioactive isotopes contained as impurities in the stimulable phosphor and radiation present in the environment. The absorbed energy of this radiation is stored in the stimulable phosphor and causes the ground noise. Moreover, particularly when the panel is used repeatedly, if the stimulation is insufficient, for instance because of the low intensity of the stimulating rays or a wrong choice of the wavelength of the stimulating rays, the stored energy partially remains in the stimulable phosphor after stimulation thereof and emission of the light. The remaining energy causes the ground noise in the image reproduction process. This ground noise of course damages the quality of the final radiation image, this defect being particularly strong when the radiation image is made for diagnostic purposes.

By exciting the panel with ultraviolet rays prior to the exposure thereof to the radiation the image of which is to be recorded according to the present invention, the energy of the radiation stored therein, causing the ground noise, is cancelled. A sharp and clear image is therefore obtained according to the present invention.

The present invention will be now illustrated in details with reference to the following examples evaluated with the following method.

A phosphor sample was exposed to 40 KVp X-Rays at 10 mA per 5 seconds, then (after 1 minute) stimulated with a He-Ne laser beam (633 nm). The emitted light was collected with a germanium photodiode detector (J16 of Judson Infrared Inc., U.S.A.) and read (in mV) with a wave analizer. A broad band collection filter to cut the reflected stimulating radiation and a plurality of narrow band selection filters were used to collect the emitted radiations at various wavelengths at intervals of 50 nm to construe the emission curve with a high signal to noise ratio, as known in the art. One emission curve (such as Curve A, B or C in FIG. 1 already described) was construed in association with each evaluated phosphor and the area obtained through integration of the emission in the wavelength emission range was taken as the measurement of the phosphor efficiency (E).

EXAMPLE 1

10.0 g of $SrSO_4$ (having a purity degree of 99.99%) were mixed with different quantities of $Na_2SO_4$ (having a purity degree of 99.99%) and further heated in the air at 1000° C. for 6 hours in a silica crucible in the open. The powders were then left to cool in air to room temperature, washed with water and sieved.

The following table reports the efficiency values of the obtained phosphors evaluated as above described.

TABLE 1

| Phosphors | E |
| --- | --- |
| 1 SrSO$_4$ | 0 |
| 2 SrSO$_4$: 2.6 × 10$^{-5}$ Na | 4 |
| 3 SrSO$_4$: 5.2 × 10$^{-3}$ Na | 1100 |
| 4 SrSO$_4$: 5.2 × 10$^{-2}$ Na | 1520 |

EXAMPLE 2

10.0 g of SrSO$_4$ were mixed with different quantities of Na$_2$SO$_4$ and SnO$_2$ and dissolved in 20 ml of concentrated H$_2$SO$_4$. The solution was evaporated at 200° C. and the crystalline powder, thus obtained, was heated in the air at 1000° C. for 6 hours, then washed with water and sieved.

The obtained phosphors were evaluated as described and the obtained efficiency values are reported in the following table.

TABLE 2

| Phosphors | E |
| --- | --- |
| 1 SrSO$_4$: 1.3 × 10$^{-4}$ Na | 885 |
| 2 SrSO$_4$: 1.3 × 10$^{-4}$ Na, 2.4 × 10$^{-4}$ Sn | 1000 |
| 3 SrSO$_4$: 1.3 × 10$^{-4}$ Na, 2.4 × 10$^{-3}$ Sn | 1465 |
| 4 SrSO$_4$: 5.2 × 10$^{-3}$ Na | 1280 |
| 5 SrSO$_4$: 5.2 × 10$^{-2}$ Na | 1335 |

EXAMPLE 3

10.0 g of SrSO$_4$ were mixed with 0.0050 g of Na$_2$SO$_4$ and with 0.0020 g of NiO or Fe$_2$O$_3$ and treated as described in Example 2.

The obtained phosphors were evaluated as described and the obtained efficiency values are reported in the following table.

TABLE 3

| Phosphors | E |
| --- | --- |
| 1 SrSO$_4$: 1.3 × 10$^{-4}$ Na | 835 |
| 2 SrSO$_4$: 1.3 × 10$^{-4}$ Na, 1.2 × 10$^{-5}$ Fe | 1000 |
| 3 SrSO$_4$: 1.3 × 10$^{-4}$ Na, 1.4 × 10$^{-3}$ Ni | 970 |

EXAMPLE 4

10.0 g of BaSO$_4$ (having a purity degree of 99.99%) and 0.0050 g of Na$_2$SO$_4$ were dissolved in 200 ml of concentrated H$_2$SO$_4$ and evaporated at 200° C. The crystalline powder thus obtained was dried and then fired at 1000° C. for 6 hours, then washed with water and sieved.

The obtained phosphor was evaluated as described in comparison with a sample of commercial BaSO$_4$ comprising, among the impurities, 90 ppm of sodium ions and with phosphor 1 of Example 2. The following table reports the obtained efficiency values.

TABLE 4

| Phosphors | E |
| --- | --- |
| 1 BaSO$_4$ | 0 |
| 2 BaSO$_4$: 3.3 × 10$^{-5}$ Na | 500 |
| 3 SrSO$_4$: 1.3 × 10$^{-4}$ Na | 885 |

EXAMPLE 5

10.0 g of SrSO$_4$ were mixed with different quantities of different alkali metal sulfates. The various mixtures were treated as described in Example 1. The obtained phosphors were evaluated as described in Example 1 by using a collection Schott BG1 filter. The following table reports the obtained phosphor compositions and their efficiency values measured as described.

TABLE 5

| Phosphors | E |
| --- | --- |
| 1 SrSO$_4$: 2.6 × 10$^{-5}$ Na | 35 |
| 2 SrSO$_4$: 6.5 × 10$^{-3}$ Na | 535 |
| 3 SrSO$_4$: 6.5 × 10$^{-2}$ Na | 740 |
| 4 SrSO$_4$: 2.6 × 10$^{-1}$ Na | 530 |
| 5 SrSO$_4$: 4.2 × 10$^{-3}$ K | 500 |
| 6 SrSO$_4$: 4.2 × 10$^{-4}$ K | 600 |
| 7 SrSO$_4$: 6.7 × 10$^{-3}$ Li | 35 |
| 8 SrSO$_4$: 6.7 × 10$^{-2}$ Li | 18 |

EXAMPLE 6

10.0 g of BaSO$_4$ were mixed with different quantities of Na$_2$SO$_4$ or K$_2$SO$_4$ and treated as described in Example 1. The obtained phosphors were evaluated as described in Example 1. The following table reports the obtained phosphor compositions and the values of their efficiency measured as described.

TABLE 6

| Phosphors | A |
| --- | --- |
| 1 BaSO$_4$: 3.3 × 10$^{-6}$ Na | 20 |
| 2 BaSO$_4$: 3.3 × 10$^{-4}$ Na | 160 |
| 3 BaSO$_4$: 6.6 × 10$^{-3}$ Na | 220 |
| 4 BaSO$_4$: 6.6 × 10$^{-2}$ Na | 110 |
| 5 BaSO$_4$: 5.4 × 10$^{-3}$ K | 160 |
| 6 BaSO$_4$: 5.4 × 10$^{-2}$ K | 600 |

EXAMPLE 7

10.0 g SrSO$_4$ were mixed with different quantities of Na$_2$SO$_4$ and heated in the air at 1000° C. for 6 hours in a silica crucible in the open. The obtained powders were then cooled to room temperature after several heat treatments as described in the below reported Table 7, washed with water and dried.

The obtained phosphors were evaluated as described and their efficiency values are reported in Table 7.

TABLE 7

| Phosphors | Heat treatment | E |
| --- | --- | --- |
| 1 SrSO$_4$: 5.2 × 10$^{-3}$ Na | Slow cooling in air* | 1210 |
| 2 SrSO$_4$: 5.2 × 10$^{-3}$ Na | Quick cooling in air** | 1265 |
| 3 SrSO$_4$: 5.2 × 10$^{-3}$ Na | Quick cooling in liquid nitrogen | 2140 |
| 4 SrSO$_4$: 5.2 × 10$^{-2}$ Na | Slow cooling in air* | 1350 |
| 5 SrSO$_4$: 5.2 × 10$^{-2}$ Na | Quick cooling in air** | 1965 |
| 6 SrSO$_4$: 5.2 × 10$^{-2}$ Na | Quick cooling in liquid nitrogen | 2290 |

*within about 8 hours
**within few minutes.

We claim:

1. A method for recording and reproducing a radiation image comprising the steps of (i) causing a phosphor, which can be stimulated by light radiation, to absorb a radiation passing through an object, (ii) stimulating said phosphor with light radiation to release the stored energy as fluorescent light, and (iii) detecting said fluorescent light with light detecting means, characterized by the fact that said stimulating radiation is in the range of visible light and the detected fluorescent light is in the range of the infrared radiation.

2. The method as claimed in claim 1 wherein the photostimulable phosphor is at least a phosphor selected from the group consisting of barium sulfates, strontium sulfates and of barium and strontium sulfate solid solutions doped with alkali metal ions.

3. The method as claimed in claim 1, wherein the photostimulable phosphor is represented by the formula:

$$(Ba_{1-x}Sr_x)SO_4:(Na,K)_y,(Sn,Fe,Ni)_z$$

wherein x is a number satisfying the condition $0 \leq x \leq 1$, y is a number satisfying the condition $10^{-4} \leq y \leq 10^{-1}$ and z is a number satisfying the condition $0 \leq z \leq 10^{-2}$.

4. The method as claimed in claim 1, wherein the wavelength of said stimulating radiation is in the range of 550 to 650 nm.

5. The method as claimed in claim 1, wherein the wavelength of the detected fluorescent light is in the range of 750 to 1200 nm.

6. The method as claimed in claim 1, wherein said stimulating radiation is a laser beam.

7. The method as claimed in claim 1, wherein said stimulating radiation is a He-Ne laser beam.

8. The method as claimed in claim 1, wherein said light detecting means comprise a photomultiplier and an optical filter absorbing visible light and transmitting infrared light.

9. The method as claimed in claim 1 comprising the step of exposing the stimulable phosphor to light having a wavelength in the region of far ultraviolet light prior to exposing the phosphor to the radiation such as to remove the energy remaining in the phosphor before the panel is exposed to the radiation.

10. A radiation image storage panel comprising a fluorescent layer including a phosphor which upon stimulation by light radiation emits radiation in the range of the infrared radiation.

11. The radiation image storage panel as claimed in claim 10 wherein the photostimulable phosphor is at least one phosphor selected from the group consisting of barium sulfates, strontium sulfates and barium and strontium sulfate solid solutions doped with alkali metal ions.

12. A photostimulable phosphor selected from the group consisting of barium sulfates, strontium sulfates or barium and strontium sulfate solid solutions doped with alkali metal ions.

13. The photostimulable phosphor of claim 12 represented by the formula:

$$(Ba_{1-x}Sr_x)SO_4:(Na,K)_y,(Sn,Fe,Ni)_z$$

wherein x is a number satisfying the condition $0 \leq x \leq 1$, y is a number satisfying the condition $10^{-4} \leq y \leq 10^{-1}$ and z is a number satisfying the condition $0 \leq z \leq 10^{-2}$.

14. A method for obtaining photostimulable phosphors selected from the group consisting of barium sulfates, strontium sulfates and barium and strontium sulfate solid solutions doped with alkali metal ions, which comprises blending barium or strontium sulfates or barium and strontium sulfate solid solutions with at least 0.05% of an alkali metal sulfate, heating in air at a temperature of at least 600° C. for at least 0.5 hour, cooling to room temperature and washing with water.

15. The method for obtaining photostimulable phosphors as claimed in claim 14, wherein the blending of barium or strontium sulfates or of barium and strontium sulfate solid solutions with the alkali metal sulfate is obtained by evaporating a solution in concentrated sulfuric acid.

16. The method for obtaining photostimulable phosphors as claimed in claim 15, wherein the concentrated sulfuric acid solution of barium or strontium sulfate or of barium and strontium sulfate solid solution and of an alkaline metal sulfate comprises an oxide of a metal chosen within the group of tin, iron and nickel.

17. The method for obtaining photostimulable phosphors as claimed in claim 14, wherein the phosphor is brought to room temperature after having been cooled from the temperature of at least 600° C. to the liquid nitrogen temperature.

* * * * *